W. H. McLAUGHLIN.
CONNECTING DEVICE.
APPLICATION FILED AUG. 21, 1917.
1,276,787.
Patented Aug. 27, 1918.
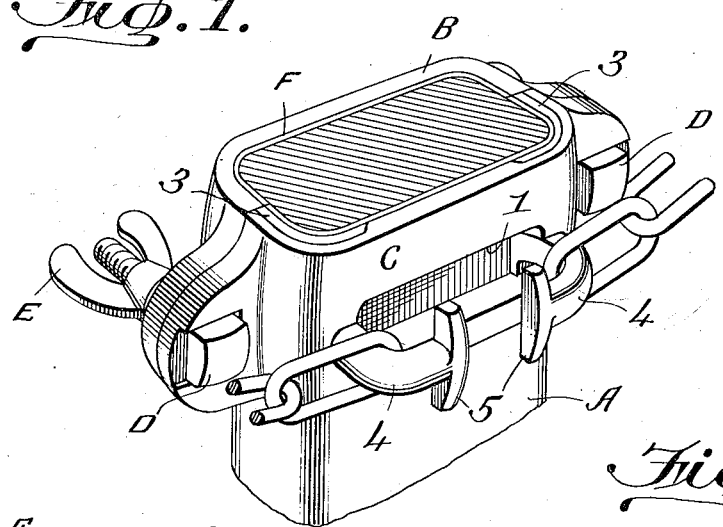
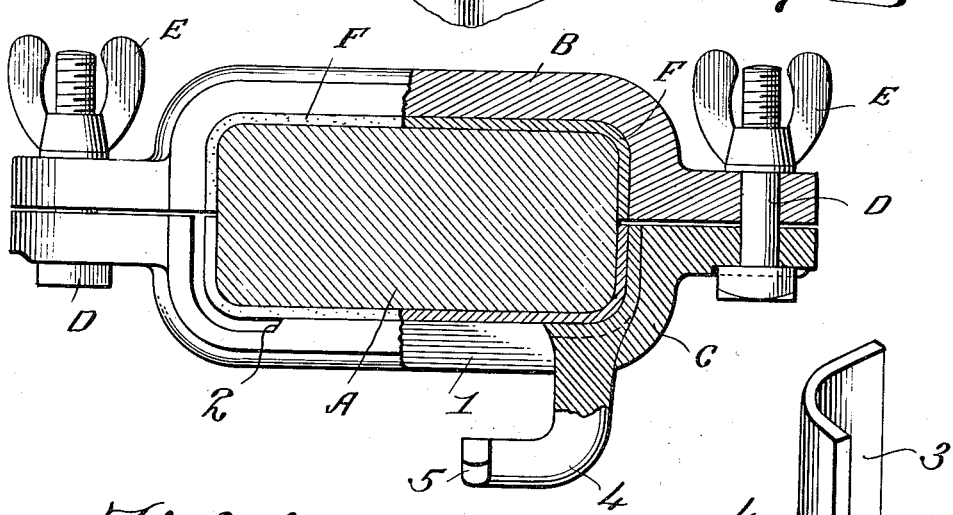
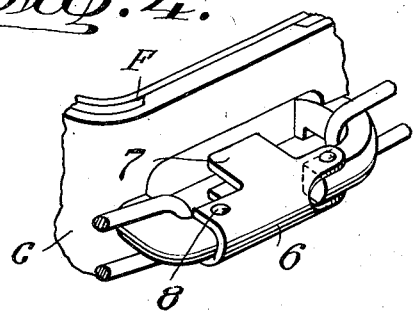
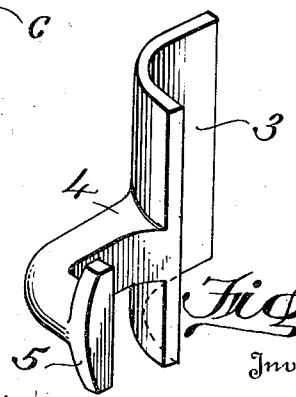
Inventor
William H. McLaughlin,
By W. H. Babcock & Son
Attorneys

UNITED STATES PATENT OFFICE.

WILLIAM H. McLAUGHLIN, OF HARTFORD, CONNECTICUT, ASSIGNOR TO CASSIUS S. CHASE, OF HARTFORD, CONNECTICUT.

CONNECTING DEVICE.

1,276,787.  Specification of Letters Patent.  Patented Aug. 27, 1918.

Application filed May 21, 1917. Serial No. 169,948.

*To all whom it may concern:*

Be it known that I, WILLIAM H. McLAUGHLIN, a citizen of the United States, residing at Hartford, in the county of Hartford and State of Connecticut, have invented certain new and useful Improvements in Connecting Devices, of which the following is a specification.

This invention relates to clamps or attaching means adapted to be attached to the spoke of an automobile truck wheel for the purpose of receiving the ends of an anti-skidding chain of the fixed point type. However, while intended for this purpose and hereinafter so described and illustrated, it is not limited to such use, but is capable of being used in a number of different arts.

Heretofore it has been proposed to cast one of the plates of the clamp with two integral hooks or projections to receive the ends of the anti-skidding chain, but this is open to some strong objections, chief among them being the weakness of these hooks of cast metal. They are found to snap off with but little strain or sudden jerk. Articles of this nature for the use mentioned must be capable of bearing heavy strains. Another serious objection is the cost of replacing the clamp member when one or both of the hooks are broken. Heretofore this latter objection has been met by employing a clamp having an attaching eye and using a drop-forged steel connector or link such as shown in my Patent No. 1,166,068, with the strength of the link so calculated that, in case the chain should get caught in car tracks, slots or other places, the connector will break before the eye of the clamp, thus saving the expense in replacing, as the cost of the link is cut a small fraction of that of the clamp member or plate.

The primary object of this invention is to provide a clamp member with two separable or removable hooks, which are preferably of drop-forged steel, the strength of which is to be calculated to yield in the same manner as the strength of the link, above referred to, with the same purpose in view, thus obtaining the chief advantage of the link, while doing away with its disadvantages, chief among which are the additional cost, two additional parts, and liability to loss or misplacement.

In the accompanying drawings:

Figure 1 represents a perspective view of a clamp embodying my invention, as applied to a spoke, a part of which is shown, its upper end being in section, with the terminal links of an anti-skidding chain on the hooks;

Fig. 2, a top plan view of the same, partly in section;

Fig. 3, a detail perspective view of one of the removable plates 3 with its integral hook 4; and Fig. 4, a detail perspective view, broken away, of a modified form of the hooks, eliminating the guards 5 and substituting therefrom a pivoted guard bridging the gap between the ends of the two hooks, but otherwise in all respects being the same.

Referring now in detail to the drawings, A designates the spoke or other element to which the clamp is applied; B, one plate of the clamp; C, the other plate of the clamp, which plates are shown as elongated U-shape in longitudinal section and provided with perforated end flanges to receive bolts D, which receive the nuts E, to draw the plates tightly on the intervening material of spoke A. They will preferably have a lining of rubber treated fabric F to prevent marring the surface of the spoke and also to get a better frictional grip thereon.

The plate C is provided with a longitudinal slot 1 and has its inner face recessed at each end to a shoulder 2 to receive the correspondingly shaped plates 3 having integral hooks 4 provided with integral transverse guards or bars 5. When thus assembled the inner faces of plates 3 are flush with the inner face of plate C, presenting a smooth inner surface toward the spoke, to the shape of which the combined inner faces of plates 3 and plate C conform.

The ends of the slot 1 are reduced, as shown, to snugly receive the stems of the hooks 4, while the greater width of the main portion of the slot allows easy insertion and withdrawal of the hooks 4 with their guards 5 therethrough.

When applied to the spoke, the material thereof will serve as a backing for the plates 3, holding them in their recesses and, as the outer faces of the plates 3 and the inner faces of the recesses of plate C fit smoothly together and engage at all points, these plates 3 will be held as firmly and solidly as if integral when the nuts E are screwed up on the bolts D to draw the end flanges of the plates B and C tightly together.

In the modification shown in Fig. 4 the construction is the same excepting that the transverse guards 5 of the hooks 4 are supplanted by a guard 6, U-shaped in cross-section, pivoted to the end of one of said hooks 4, provided with central flanges 7 extending toward plate C to the plane of the surface thereof, and provided with inwardly stamped lugs or points 8, which fit into corresponding recesses 9 of the other hook 3. This guard 6 is stamped out of resilient sheet metal and is similar in purpose and operation to the guard shown in Patent No. 1,166,068, above mentioned.

In case one of the hooks 4 is snapped off it is an easy matter, taking but a few minutes at most, to remove the clamp, lift one end of the lining F of plate C, remove the plate 3 with the broken hook 4 and replace it with a similar one, and then fix the clamp back in its old position, when it will be ready for immediate use.

Any suitable material may be used for any parts, but drop-forged steel is preferred for the plates 3 and hooks 4 when said hooks are to be put to a use in which they will have to bear heavy strains such as are encountered in anti-skidding devices.

Having thus described my invention, what I claim as new and desire to secure by Letters Patent is:

1. A plate provided with a longitudinal slot and having the ends of its inner face recessed, in combination with removable plates adapted to fit in said recesses and provided with parts adapted to project through said slot.

2. A plate provided with a perforation and having a portion of its inner face recessed, in combination with a removable plate adapted to fit in said recess and having a part adapted to project through said perforation.

3. A plate provided with a slot and having its inner face provided with recesses, in combination with plates corresponding in shape to, and adapted to fit in, said recesses respectively and provided with hooks adapted to project through said slot and provided with integral guards.

4. A plate provided with a longitudinal slot and having the end portions of its inner face recessed, in combination with removable plates adapted to fit in said recesses respectively and provided with integral hooks adapted to project through said slot and having integral transverse guards.

5. A plate provided with a longitudinal slot and having the end portions of its inner face recessed and provided with shoulders, in combination with removable plates adapted to fit in said recesses and abut against said shoulders and provided with integral parts adapted to project through said slot.

6. A pair of clamp plates and means for holding said plates together on some intervening object, one of said plates being provided with a longitudinal slot and having the end portions of its inner face recessed and provided with shoulders, in combination with removable plates corresponding in shape to, and adapted to fit in, said recesses respectively and provided with hooks adapted to project through said slot, said removable plates being held in position by the article on which said clamp plates are normally mounted.

In testimony whereof, I have signed my name to this specification in the presence of two subscribing witnesses.

WILLIAM H. McLAUGHLIN.

Witnesses:
E. J. MARKHAM,
E. S. BESTOR.